United States Patent Office 3,121,208
Patented Feb. 11, 1964

3,121,208
IMMERSED BOLOMETERS AND IMMERSION GLASSES THEREFOR
Eskil L. Karlson, Stamford, Conn., and Joseph V. Kiernan, Yonkers, N.Y., assignors to Barnes Engineering Company, Stamford, Conn., a corporation of Delaware
No Drawing. Filed July 10, 1963, Ser. No. 294,177
4 Claims. (Cl. 338—18)

This invention relates to improved immersed thermistor bolometers and to immersion glasses therefor.

In the past, thermistors, particularly thermistors made of oxides of manganese, cobalt and nickel, have been immersed on various lenses which also act as heat sinks. Since the thermistors are used ordinarily with interrupted radiation, the heat sink is a necessary element.

Various materials have been used for lenses, both dielectric, such as fused aluminum oxide, and more particularly semiconductors of germanium. In both cases it is necessary to provide a layer for immersion which has to have certain characteristics:

(1) In a thin film it must be transparent throughout a usable range in the infrared.

(2) The electrical conductivity must be low so that it will not short-circuit the thermistors and, in the case of germanium lenses, will insulate the thermistors therefrom.

(3) The refractive index must be sufficiently high so that the immersion gain is not significantly degraded. This means a refractive index not too far from 2.35.

(4) The immersion layer must not crystallize and produce electrical noise.

(5) The layer must have a long softening range and a thermal expansion not too far removed from that of the oxide thermistors.

(6) The layer must have a softening point sufficiently high so that the immersed bolometers produced can be operated at elevated temperatures.

Selenium proved to have many of the above desirable characteristics. However, in two respects it showed drawbacks. The most important one was its low melting point, which did not permit bolometer operation substantially above 65°–75° C., and if not carefully deposited, there was a tendency to crystallize, which produced electrical noise in the bolometer.

The first improvement was to form an amorphous solid solution, a glass, containing some arsenic. This exhibited improved properties, but unless it was deposited under a vacuum under very sharply controlled conditions, the composition of the glass was quite variable, down to the point where, with too low vaporization temperatures, layers of almost pure selenium were produced with insignificant amounts of arsenic. The arsenic-modified selenium glass had somewhat higher softening point, but still left much to be desired.

The present invention solves the problem of an immersion glass by a family of materials which are four-element glasses. The four elements are selenium from 55% to 75%, arsenic from 5% to 30%, sulphur up to 12% and thallium in the range of 2% to 10%. All percentages are by weight. In the main, the largest constituent will be seen to be selenium, and this is the primary factor in producing a refractive index which is suitable to prevent degradation of the increased responsivity produced by immersion. Arsenic raises the softening point, reduces the tendency of the material to crystallize, and reduces the coefficient of thermal expansion in the operating temperature range. Sulphur improves the wetting and adhesion properties of the glass to lens material but must not exceed the upper limit given above. Germanium is more sensitive and when the glass is used with a germanium lens the upper limit should be 10%. Finally, thallium increases the range of softening temperature and thereby reduces immersion stresses on the oxide thermistor flakes.

It is an advantage of the present invention that, although certain operating procedures are desirable, they are not so critical as to constitute a problem in practical manufacture. In general it is desirable to preform the glass before it is vacuum deposited on its substrate, such as a germanium lens. This has been found desirable because the vaporization temperatures of the four elements are quite different. If a physical mixture is used in vacuum deposition, it is extremely difficult, if not impractical, to deposit uniform, reproducible glass layers. While it is desirable to preform the glass by melting and heating, it is by no means necessary to do this immediately preceding vaporization in vacuum deposition apparatus. On the contrary, after it has once been formed, the glass can be cooled and ground up into coarse powder or other physical form in which it stores well and can be used for vacuum deposition to produce uniform layers.

It should be realized that the formation of thin films by vacuum deposition is still very much of an art. Thus, while the glasses of the present invention can be readily handled, the skill of the trained vacuum deposition technician must still be used. Accordingly, in the more specific parts of the present specification, no attempt will be made to reduce deposition characteristics to a rigid numerical form, because they will vary with the vacuum system used and require the services, at least initially, of skilled personnel. It is, however, an advantage of the present invention that the four-element glasses do not present serious deposition problems and can be handled by the ordinary skilled technician.

The invention will be described in more detail in conjunction with the specific examples of a typical glass falling within the range of the present invention and showing excellent immersion properties.

*Example 1*

A mixture of 64% selenium, 23% arsenic, 10% sulphur, and 3% thallium is heated together until a uniform glass is produced. The glass is then allowed to cool, comminuted, and placed in a heating boat in a vacuum deposition apparatus. A germanium lens is located above the boat with suitable masking so that only its lower surface is exposed. The conventional shutter of the vacuum equipment is closed, and the system evacuated to about $10^{-6}$ mm. Hg. The lens or lenses are warmed up to be between 75° and 100° C., the boat is heated to between 400° and 500° C., and the shutter opened. A layer of from 6 to $10\mu$ is deposited.

The lens is then removed and oxide thermistor flakes immersed in the customary manner by pressure, the layer being heated to between 170° and 190° C.

Bolometers result with low noise ratios and high signal-to-noise. With the coating thicknesses described above, the time constant is from about .9 to 3.0 msec.

*Example 2*

The glass of Example 1 is introduced into a vacuum deposition apparatus which does not have a shutter. This requires a precise weighing of the batch of comminuted glass as there is no possibility of controlling the layer thickness by deposition time as is the case in Example 1.

One or more germanium lenses are mounted as described in Example 1 and the same degree of evacuation and temperatures used. Layers from 5 to $12\mu$ can be deposited by this batch method. The lenses are then removed and thermistor flakes immersed thereon as described in Example 1. The resulting bolometers have substantially the same characteristics as those produced by the timed deposition method of Example 1.

The bolometers with the glass layers deposited as described in the above examples show good wetting, no crystallization, adequate dielectric strength and thermal conductivity, and have a lower expansion coefficient, around 60% of that of the customary 80–20 selenium-arsenic glasses. The softening range is from 145° to 200° C., as compared to 90°–140° for the arsenic modified selenium. Bolometers therefore are useful at temperatures up to around 140° C. as opposed to less than 90° C. for the arsenic-selenium glasses.

It should be noted that not only is the four-element glass of the above examples improved in its softening point, but this is obtained without any shortening of the softening range, which is actually longer than with the selenium-arsenic glasses used heretofore. This makes manufacture of the immersed bolometer simpler and results in a minimum strain on the thermistor flakes during use.

We claim:
1. An immersion glass suitable for vacuum deposition comprising from 2% to 10% thallium, from 5% to 12% sulphur, from 5% to 30% arsenic, and the balance selenium.
2. An immersion glass according to claim 1 having a composition by weight of approximately 64% selenium, 23% arsenic, 10% sulphur and 3% thallium.
3. An immersed bolometer comprising a germanium lens and oxide thermistors immersed thereon in a layer of glass according to claim 1 containing not more than 10% sulphur.
4. An immersed bolometer comprising a germanium lens and oxide thermistors immersed thereon in a layer of glass according to claim 2.

References Cited in the file of this patent
UNITED STATES PATENTS

| | | |
|---|---|---|
| 2,883,292 | Jerger | Apr. 21, 1959 |
| 2,883,295 | Jerger | Apr. 21, 1959 |
| 2,994,053 | De Waard | July 25, 1961 |
| 3,039,896 | Van Cakenberghe et al. | June 19, 1962 |
| 3,059,113 | McHenry | Oct. 16, 1962 |